[12] United States Patent
Ramrakhyani et al.

(10) Patent No.: US 10,866,899 B2
(45) Date of Patent: Dec. 15, 2020

(54) METHOD AND APPARATUS FOR CONTROL OF A TIERED MEMORY SYSTEM

(71) Applicant: ARM LTD, Cambridge (GB)

(72) Inventors: Prakash S. Ramrakhyani, Austin, TX (US); Joshua Randall, Austin, TX (US); Wendy Arnott Elsasser, Austin, TX (US)

(73) Assignee: ARM LTD, Cambridge (GB)

( * ) Notice: Subject to any disclaimer, the term of this patent is extended or adjusted under 35 U.S.C. 154(b) by 450 days.

(21) Appl. No.: 15/722,350

(22) Filed: Oct. 2, 2017

(65) Prior Publication Data

US 2019/0102310 A1   Apr. 4, 2019

(51) Int. Cl.
*G06F 12/0875* (2016.01)
*G06F 12/0811* (2016.01)
*G06F 12/1081* (2016.01)

(52) U.S. Cl.
CPC ...... *G06F 12/0875* (2013.01); *G06F 12/0811* (2013.01); *G06F 12/1081* (2013.01)

(58) Field of Classification Search
CPC .... G06F 2212/502; G06F 11/34; G06F 12/08; G06F 12/0811; G06F 12/1081; G06F 12/1045; G06F 12/0875; G06F 2212/1024; G06F 12/0888; G06F 2212/651
See application file for complete search history.

(56) References Cited

U.S. PATENT DOCUMENTS

| 2007/0169051 A1* | 7/2007 | Krauss ............... G06F 11/3612 717/154 |
| 2012/0191900 A1* | 7/2012 | Kunimatsu ......... G06F 12/0223 711/103 |
| 2015/0052287 A1* | 2/2015 | Venkatasubramanian ................... G06F 9/5033 711/6 |
| 2015/0199126 A1* | 7/2015 | Jayasena ............... G11C 11/005 711/103 |

(Continued)

OTHER PUBLICATIONS

C. C. Chou, A. Jaleel and M. K. Qureshi, "CAMEO: A Two-Level Memory Organization with Capacity of Main Memory and Flexibility of Hardware-Managed Cache," 2014 47th Annual IEEE/ACM International Symposium on Microarchitecture, Cambridge, 2014, pp. 1-12. doi: 10.1109/MICRO.2014.63.

*Primary Examiner* — Shean Tokuta
*Assistant Examiner* — Juan C Turriate Gastulo
(74) *Attorney, Agent, or Firm* — Leveque IP Law, P.C.

(57) ABSTRACT

A method and apparatus for controlling data organization in a tiered memory system, where the system comprises a lower and higher bandwidth memories. Accesses to the tiered memory system by an action of a computing device in a first time interval are monitored to determine a first measure of bandwidth utilization, from which it is determined if the action is in a high bandwidth phase for which a first measure of bandwidth utilization is greater than an upper value. It is further determined, from confidence counters, if a monitored access is consistent with respect to the first instructions or with respect to a memory address of the access. Data associated with the access is moved from the lower bandwidth memory to the higher bandwidth memory when the action is in a high bandwidth phase, the access is consistent, and bandwidth utilization of the higher bandwidth memory is below a threshold.

24 Claims, 6 Drawing Sheets

(56) References Cited

U.S. PATENT DOCUMENTS

| | | | |
|---|---|---|---|
| 2015/0278091 A1* | 10/2015 | Wilkerson | G11C 7/1072 |
| | | | 711/105 |
| 2017/0160949 A1* | 6/2017 | Greenfield | G06F 9/5016 |
| 2018/0157970 A1* | 6/2018 | Henry | G06N 3/04 |
| 2018/0342283 A1* | 11/2018 | Lee | G11C 11/40611 |
| 2019/0052532 A1* | 2/2019 | Chen | H04L 41/0896 |
| 2019/0205058 A1* | 7/2019 | Jin | G06F 12/08 |

* cited by examiner

METHOD AND APPARATUS FOR CONTROL OF A TIERED MEMORY SYSTEM

TECHNICAL FIELD

The present disclosure relates to the control of tiered memory system of a data processing system.

BACKGROUND

A data processing system may include multiple computing devices, of various types, and multiple memory resource of different types. For example, a system may include a tiered memory system having first and second memories, in which the second memory has a higher bandwidth and a lower capacity compared to the first memory. In a tiered memory system, the second memory may be located on the same substrate as the computing device (i.e. on-chip) and the first memory may be located off-chip. Alternatively, a system may include a tiered memory with low latency memory (such as a cache) and a higher latency, higher capacity memory. Here, bandwidth refers to the rate at which data can be accessed (bytes per second) while latency refers to the time taken for a single access.

One approach to improving performance of the system is to move the most recently accessed data to a memory, such as a cache, having a lower access latency in case it will be accessed again. However, this approach does not make optimal use of the high bandwidth memory, since there is no indication of the likely rate at which the data will be accessed in the future.

There exists need, therefore, to optimize memory bandwidth utilization in a tiered memory system.

DETAILED DESCRIPTION OF THE EMBODIMENTS

Figure 1:
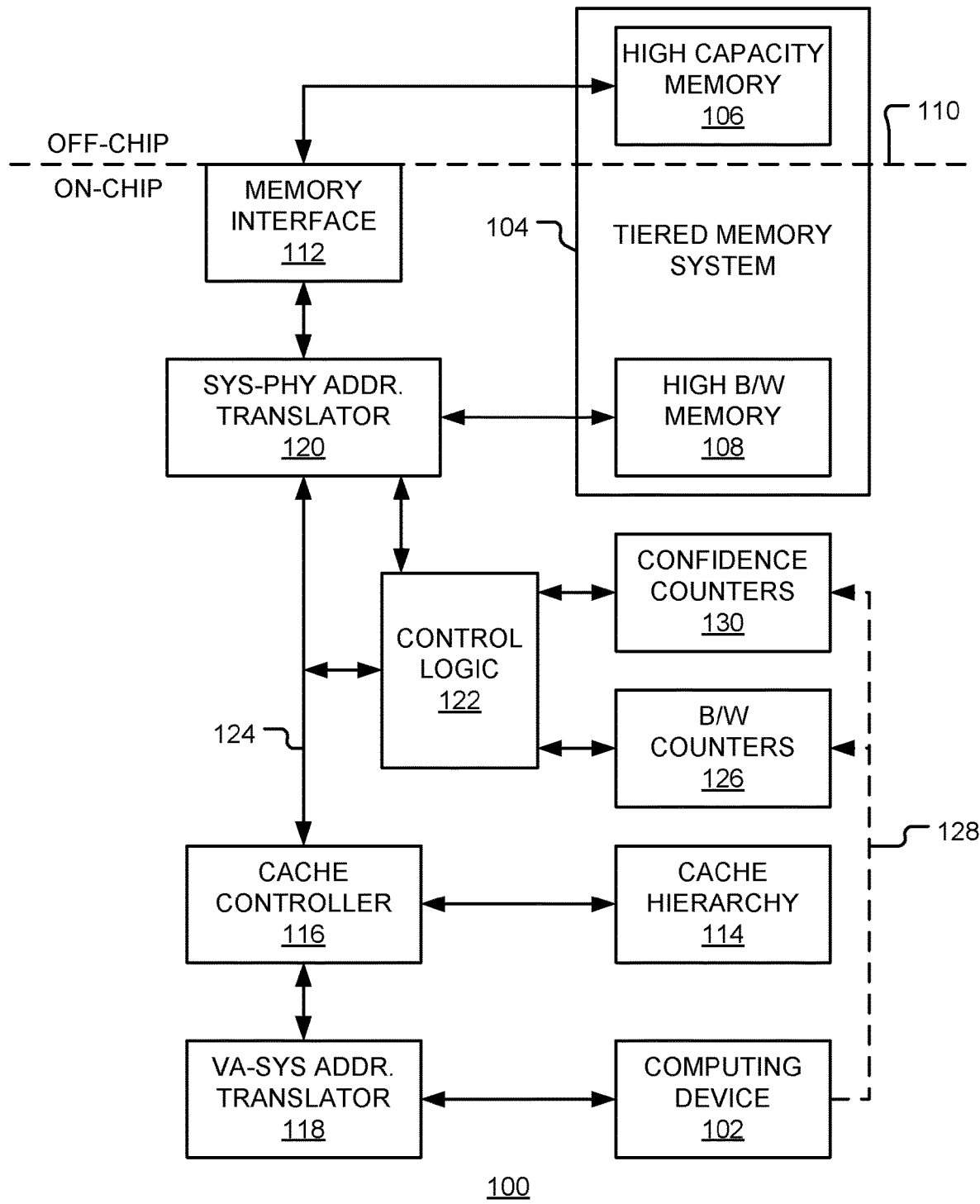
FIG. 1 shows a data processing system with a tiered memory system, consistent with certain embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure related to a mechanism for improving memory bandwidth utilization in a tiered memory system of a data processing system. The memory includes first and second memories where the second memory has a higher bandwidth (but possibly lower capacity) than the first memory. In one embodiment, for example, memory lines or pages that are requested during bandwidth intensive phases of an application are selected to be placed in the higher bandwidth memory. Such a selective movement of data reduces the amount of unwanted movement compared to simpler schemes that always promote the most recently requested line or page to the higher bandwidth memory.

FIG. 1 is a block diagram of a data processing apparatus 100 consistent with embodiments of the disclosure. Referring to FIG. 1, data processing apparatus 100 includes at least one computing device 102, which may include one or more processing cores and associated memory, and a tiered memory system 104. In this example, memory system 104 is a two-tiered memory system that has at least a first memory 106 and a second memory 108. First memory 106 may be, for example, a high-capacity/low-bandwidth memory. Second memory 108 may be a low-capacity/high-bandwidth memory, compared to the first memory. For example, second memory 108 may comprise a high-bandwidth, stacked die memory, such as a stacked dynamic random access memory (stacked DRAM).

Here, 'bandwidth' is taken to mean the rate at which data in the memory can be accessed, and is can be measured in bytes-per-second, megabytes-per-second, or gigabytes-per-second, for example. Capacity is taken to mean the total number of data bytes that can be stored in the memory.

In accordance with embodiments of the disclosure, data is selectively moved or copied between first memory 106 and second memory 108 with the objective of increasing the proportion of memory accesses that are directed to the higher bandwidth memory as opposed to the lower bandwidth memory 106. In operation, computing device 102 executes a program of instructions that causes the processor to access data stored in the first memory 106. In this embodiment, first memory 106 is located off-chip relative to processor 102, as depicted by dashed line 110, and is accessed via memory interface 112. Accessing the tiered memory introduces a latency into the system which can degrade the performance of computing device 120, so recently accessed data may be moved or copied to an on-chip, low-latency cache in cache hierarchy 114. Cache controller 116 determines when requested data associated with a specified address in located in the cache hierarchy 114 or in the tiered memory system 104. Cache hierarchy 114 includes one or more levels of caches. Each cache comprises a high-speed memory, such as static random access memory (SRAM). However, the sizes of the caches may be limited by cost or other design constraints.

Computing device 102 contains one or more processor cores arranged to process data in accordance with virtual memory addresses. Each of the processor cores may process data in accordance with virtual memory addresses in a respective virtual memory address space. This may be done, for example, under the control of an operating system or a so-called hypervisor which allocates virtual memory address spaces to the processes being performed by the different processor cores. This technique avoids a process associated with one processor core accidently or maliciously accessing data appropriate to a process being executed by another of the processor cores.

Addressable devices in the data processing system as a whole are associated with a system address space. Virtual-system address translator 118 translates a virtual address to a system address and may use a mechanism such as a translation lookaside buffer (TLB), for example. The resulting system address is passed to cache controller 116, which determines if a copy of the data associated with the system address is stored in the cache hierarchy 114 (referred to as a 'hit') or if the tiered memory must be accessed.

A system address may be a physical address in a memory or other storage device, an address of another addressable device in the data processing system. A system address may require additional address translation. For example, a system address may indicate that the memory location is in the tiered memory system 104, but an additional address translation may be performed by system-to-physical address translator 118. System-to-physical address translator 118 keeps track of the location of data, translates memory addresses and directs memory accesses to the appropriate memory of the first and second memories. This may be achieved using a lookup table, for example.

The use of caching, as discussed above, reduces latency in the data processing system. However, it does not optimize the use of available data bandwidth in tiered memory 104.

In accordance with embodiments of the disclosure, data processing system 100 includes control logic 122 that controls the organization of data stored in tiered memory system 104. Control logic 122 monitors line 124 to monitor accesses by computing device 102 to the tiered memory system 104. Control logic 122 accesses one or more bandwidth utilization counters 126 that are updated responsive to each access to the tiered memory system. In one embodiment, each processing core of the computing device updates one or more associated bandwidth utilization counters, as indicated by dashed line 128. Alternatively, counters 126 may be updated by control logic 122. Some existing processors include performance monitoring counters that count predetermined or user-selected events. For example, an event might be a miss in the lowest level cache that necessitates an access of the tiered memory. The bandwidth utilization may be determined by looking at a change in a counter value over a known time interval. Events may be monitored on a per core, per application, per process or per thread basis, for example. Control logic 122 determines, from the one or more bandwidth utilization counters, when the associated processing core is in a high bandwidth phase. Control logic 122 also accesses a table of confidence counters 130 that updates responsive to accesses to the tiered memory system. The table of confidence counters is indexed by system addresses accessed in the tiered memory or by values of a program counter of the processor core of the computing device. Control logic 122 identifies, from the table of confidence counter 130, when data stored at a first address in the first memory 106 is repeatedly accessed while the processing core is in a high bandwidth phase. In addition, control logic 122 causes the identified data to be moved or copied from the first memory 106 to the second memory 108.

For example, when the second memory comprises a cache, the control logic may cause the identified data at the first address in the first memory to be copied to the second address in the second memory. Alternatively, when the second memory comprises system memory, the control logic may cause the identified data at the first address in the first memory to be moved to the second address in the second memory.

Second memory 108 may be used, in a similar manner to a cache, to store a copy of the identified data. In this embodiment, the first address may be a physical address in the first memory. Address translator 120 translates the first address to a physical address in the second memory when identified data at the first address in the first memory has been copied to the second address in the second memory. Address translator 120 is updated when the control logic causes the identified data at the first address in the first memory to be written to the second address in the second memory.

Alternatively, data in the first and second memories may be swapped. That is, data previously stored at the second address in the second memory is moved to the first address in the first memory. In this case, tiered memory system 104 is addressed by a first address space, and address translator 120 translates an address in the first address space to a physical address in either the first memory or the second memory. Again, the address translator is updated when the control logic causes the identified data at the first address in the first memory to be written to the second address in the second memory.

In one embodiment, bandwidth utilization counters 126 may include a first bandwidth counter that counts a first number of accesses to the tiered memory by the computing device during a first time interval, and a second bandwidth counter that counts a second number of accesses to the tiered memory by the computing device during a second time interval, where the second time interval is longer than the first time interval. In this embodiment, control logic 122 determines the computing device 102 to be in a high bandwidth phase when the second number of accesses exceeds an upper threshold value. The first time interval may be a moving time window, for example.

In one embodiment, data stored at a first address in the first memory is determined to be repeatedly accessed when an associated confidence counter exceeds a third threshold value.

Bandwidth utilization may be measured in various ways. In a one embodiment an online moving window strategy is used that involves two registers. A first register, register 'A', maintains the average bandwidth measured the last time a request was encountered. A second register, register 'T' is a saturating counter that counts up to N cycles where N is a window over which a moving average is maintained. When a new memory request is encountered, the new average bandwidth $a_{new}$ in bytes/sec is computed as follows:

$$t = n/N \quad (1)$$

$$a_{new} = (1-t) \times a_{current} + t \times \frac{requestSizeInBytes}{n \times P}$$

where $a_{current}$ is the current value in register A, n is the current counter value in register T, and P is the time period of one cycle.

The saturating counter T is reset after the bandwidth in register A has been updated, i.e. each time a new request is encountered.

In a second embodiment, where existing performance counters on a System on Chip (SoC) are utilized. A performance counter C is set up to count the number of requests to memory over a set number of cycles, M. At the end of every M cycles (with time period $T_p$) the average bandwidth a is calculated as:

$$a = \frac{c \times requestSizeInBytes}{M \times T_p} \quad (2)$$

where c is the value of the performance counter C. The counter C is reset after the average bandwidth is calculated.

Other indicators of the average bandwidth may be used. The two strategies indicated by equations (1) and (2) can be applied in any combination to measure long term and short term bandwidths. For example, the period for the long term bandwidth 'L' can be set to be an integral multiple of the period for the short term bandwidth 'S' and the strategy of equation (2) can be used to measure the short term bandwidth. For long term bandwidth, the strategy of equation (1) with P=S.

Figure 5:
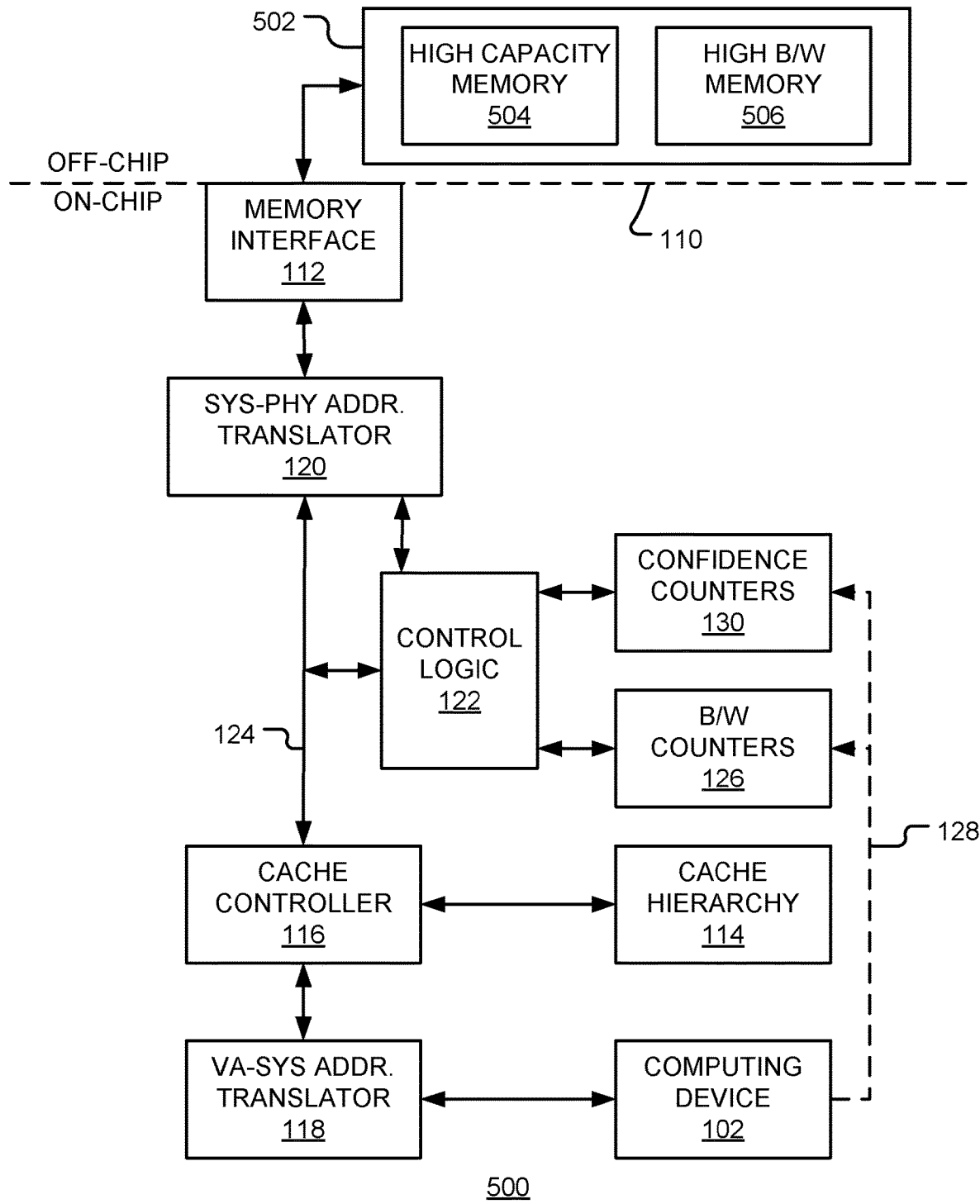
FIGS. 5 and 6 show further embodiments of a data processing system with a tiered memory system, consistent with the disclosure.
Figure 6:
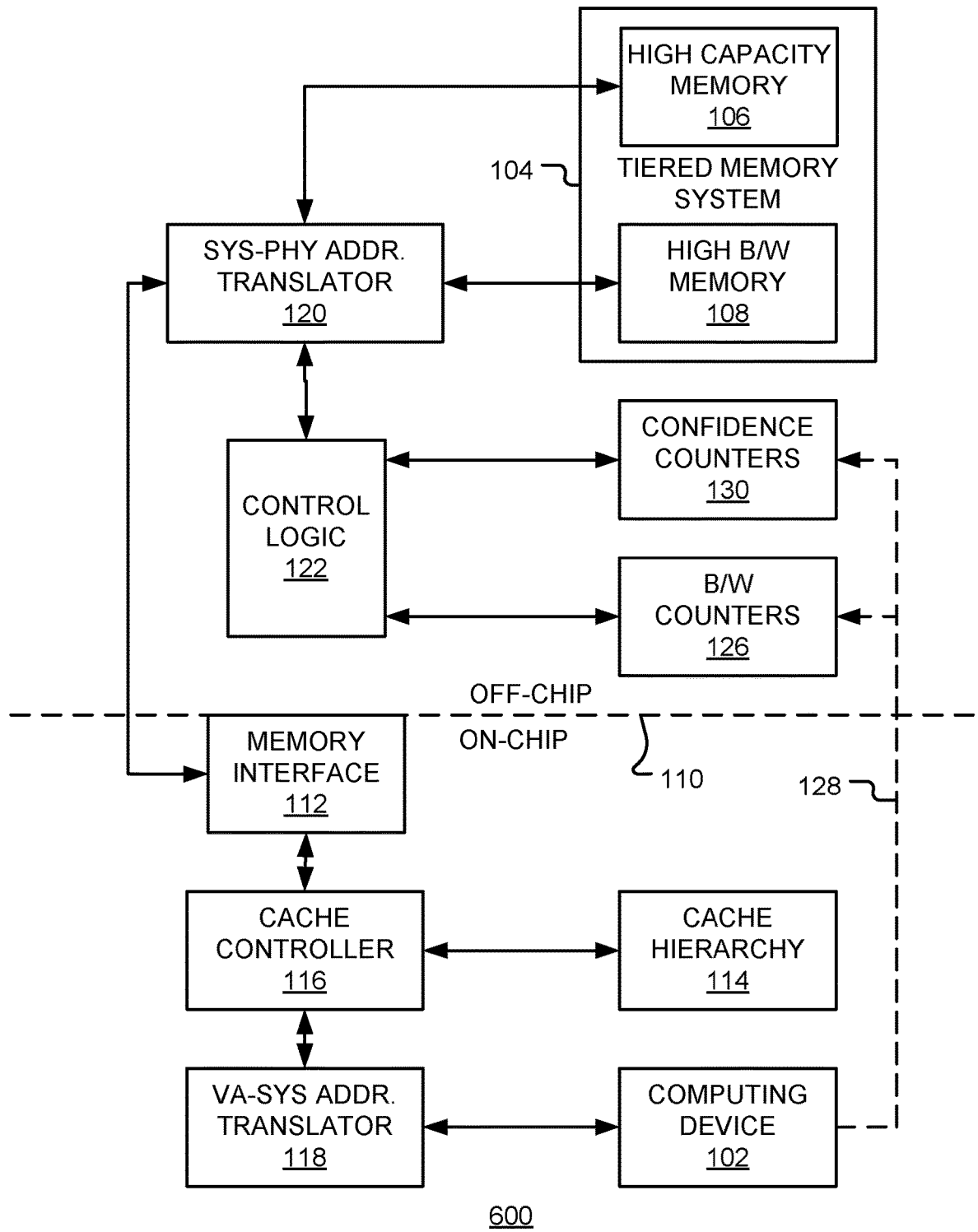

In the embodiment shown in FIG. 1, the elements designate 'on-chip', i,e, the element below line 110, are contained in an integrated circuit. However, the elements may be arranged in various ways without departing from the present disclosure. For example, the data processing system may be arranged as a network of devices having multiple processors and multiple storage devices. The processors and storage devices may be linked via memory node controllers. In this example, some elements, such as control logic 122, confidence counters 130 and system-physical address translator 120 may be located in a memory node controller. Other arrangements will be apparent to those of skill in the art. Further example arrangements are shown in FIG. 5 and FIG. 6, discussed below.

A function of control logic 122 is to determine when data should be moved or copied from the first to the second memory of the tiered memory 104. To this end, memory access requests are monitored and analyzed. Data related to this analysis, such as confidence counters 130 may be stored in local memory of the control logic. Alternatively, the data may be stored in the tiered memory itself or in the lowest level cache (LLC) of the cache hierarchy.

The various functional blocks shown in FIG. 1 may be implemented using dedicated hardware mechanisms. Additional elements, such as power supplies and clocks for example, have been omitted for the sake of simplicity.

Operation is discussed in more detail below.

In a data processing system, one or more computing devices perform operations due to execution of computer instructions. As discussed above, the instructions may be executed on a single processing core or on multiple processing cores. The instructions may be part of an application and may define an execution thread or a process, for example. The operations include requesting access to memory at a specified memory address for reading or writing data.

A first part of the process of memory organization is the identification of actions that are using high memory bandwidth. This may be done, for example, by measuring bandwidth utilization over one or more time intervals for each action of a computing device. The actions may be associated with a particular core, process, thread or application, for example. The bandwidth utilization may be measured as an average number of memory access. The action having the highest bandwidth utilization over the time interval is identified as the one having the highest priority. An interval may be a moving window, for example. Bandwidth utilization may be measured for all active actions. When the measured bandwidth utilization is above an upper threshold, the action is identified as being in a high bandwidth phase. When the measured bandwidth utilization is below a lower threshold, the action is identified as being in a low bandwidth phase. Each action is associated with a corresponding core, process, thread, or application. Such an identification of high and low bandwidth phases can be done either on a per action basis or for the entire data processing system.

A second part of the process is the identification of which divisions of tiered memory need to be located in higher bandwidth memory 108, and promoting them from the lower bandwidth memory 106. The divisions may be lines or pages, for example. In one embodiment, this is done by maintaining a table of confidence counters 130 that can be indexed by a hash of either the program counter (PC) of the instructions that generate misses in the LLC of the cache hierarchy 114, or the physical addresses that generated the misses. Each entry in the table is a counter that is incremented whenever a miss corresponding to the entry is encountered during an action in a high bandwidth phase. When a confidence counter crosses a threshold, the lines that index to it are identified as candidates for inclusion in high bandwidth memory. The counter is decremented when a miss is encountered for an action in a low bandwidth phase. In one embodiment, the bandwidth history is maintained on a per action basis then the confidence counters are maintained only for actions that are identified as being in a high bandwidth phase. If there are multiple actions having a high bandwidth utilization, they are prioritized by making allocation for actions that have the highest requirements. Data associated with lower priority actions may be removed from the higher bandwidth memory 108 (demoted to the lower bandwidth memory 106) when there is insufficient space for higher priority data in the higher bandwidth memory.

Figure 2:
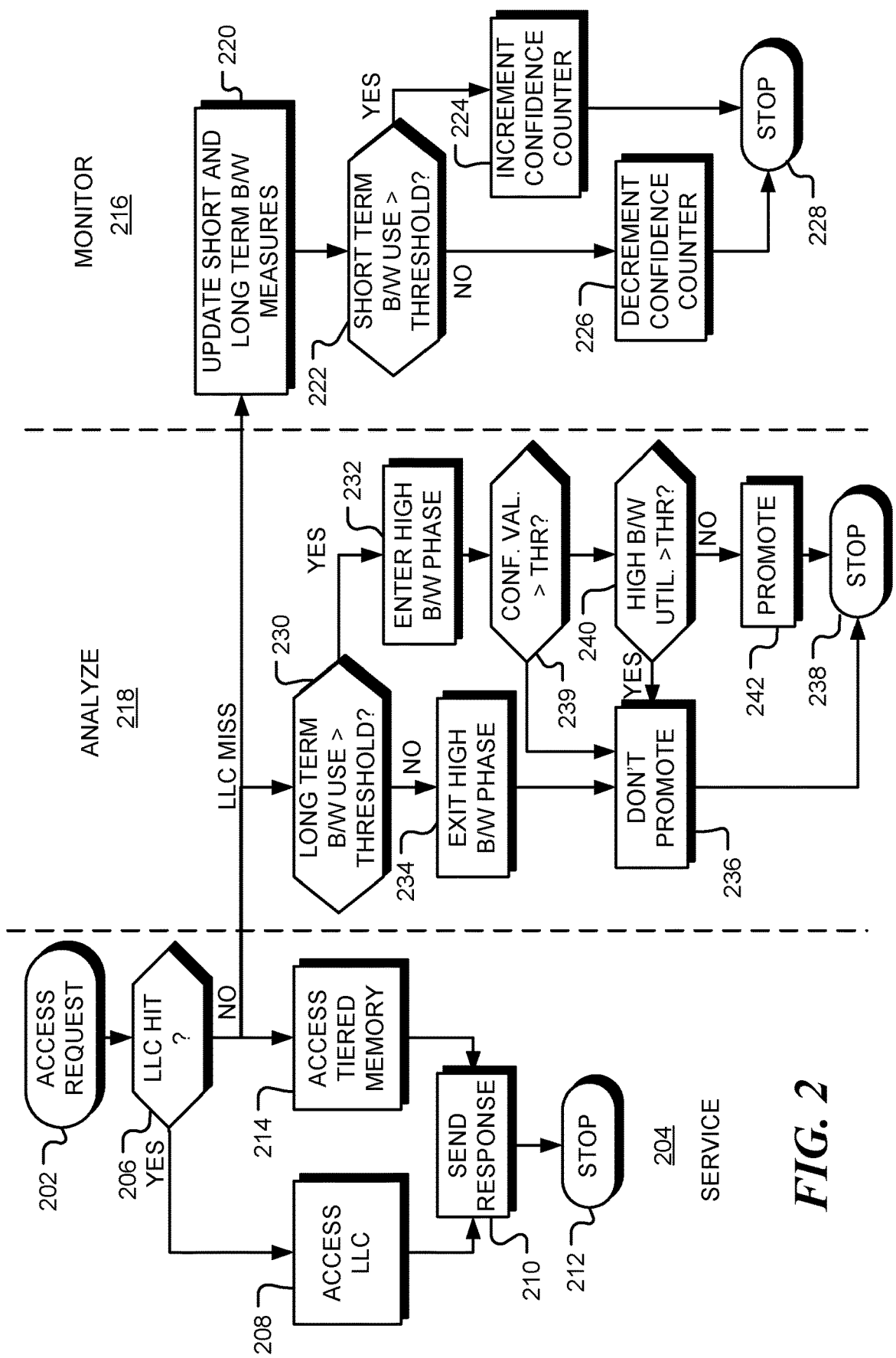
FIG. 2 is a flow chart of method for controlling data organization in a tiered memory system, consistent with embodiments of the disclosure.

FIG. 2 is a flow chart of a method for controlling memory bandwidth utilization in a tiered memory system, consistent with embodiments of the disclosure. Following a memory access request at block 202 in FIG. 2, the request is serviced in process 204. The memory address to be accessed is checked to determine if the data is present in the lowest level cache (LLC). If the data is stored in the LLC, as indicated by the positive branch from decision block 206 (this is referred to as a cache 'hit'), the LLC is accessed at block 208 and a response (such as an acknowledgment or data read from the cache) is sent at block 210 to the device that made the access request. This completes the response, as indicated by termination block 212. Alternatively, if a cache 'miss' occurs, as depicted by the negative branch from decision block 206, the tiered memory is accessed at block 214. In accordance with embodiments of the disclosure, memory access requests are monitored by process 216, and analyzed by process 218 to determine when, and how, data in the tiered memory should be reorganized. For simplicity, the tiered memory is assumed to comprise a first memory and a second memory system, where the second memory has a higher bandwidth than the first memory.

In the monitoring process 216, which is executed when a LLC miss occurs (as depicted by the negative branch from decision block 206), one or more measures of bandwidth utilization are updated at block 220. For each action, the measures are related to bandwidth utilization, that is, the rate of memory accesses over some time scale. For example, a measure may related be a time-averaged rate of memory accesses to the high capacity memory over a time interval, or a maximum rate of memory access. In addition, memory accesses to the high bandwidth memory may also be monitored at block 220. In one embodiment, the measures are related to the average number of accesses made in a short-term moving time window and the average number of accesses over a longer term time window. Other measures may be used, such as the number of accesses in the last N time windows and/or a recursive average of the number of accesses. In the example embodiment shown in FIG. 2, long and short term measures of bandwidth utilization are used. If the short term bandwidth utilization is above a threshold value, as depicted by the positive branch from decision block 222, a confidence counter is incremented at block 224, otherwise the confidence counter is decremented at block 226. The monitoring process terminates at block 228. A table of confidence counters may be maintained, with a confidence counter for each active process and for each division of memory accessed. The index to the table is a function of the memory address of the request and/or the program counter of the instruction that generated the memory request, for example.

In analysis process 218, which is also executed when a LLC miss occurs (as depicted by the negative branch from decision block 206), the long-term bandwidth utilization measure is compared to one or more threshold values at decision block 230. If the long-term bandwidth utilization measure exceeds an upper threshold value, as depicted by the positive branch from decision block 230, the action is deemed to be in a high bandwidth phase at block 232. Conversely, if the bandwidth utilization for the action is below a lower threshold value, as depicted by the negative branch from decision block 230 the action is deemed to be in a low bandwidth phase at block 234. When in the low bandwidth phase, the accessed data is not promoted from the first memory to the second memory, as indicated by block 236 and the analysis process is complete as indicated by termination block 238. However, if the action is deemed to be in a high bandwidth phase, flow continues to decision block 239. If a confidence counter associated with an accessed division of memory is above a threshold and the action is in a high bandwidth phase, as depicted by the positive branch from decision block 239, flow continues to decision block 240. If the high bandwidth memory utilization is not greater than a selected threshold, as depicted by the negative branch from decision block 240, the division (e.g. the page or line) of memory is moved or copied from the lower bandwidth memory to the higher bandwidth memory (i.e. promoted) at block 242 and the analysis process ends at termination block 238. Conversely, if the confidence counter associated with the division of memory is below the threshold, as depicted by the negative branch from decision block 239, or if $a_{current}$ as depicted by the positive branch from decision block 240, the division is not promoted to the higher bandwidth memory, as indicated by block 236. The use of a selected threshold on the utilization of high bandwidth memory at block 240 avoids excessive promotion and demotion of memory which cause generate too much overhead traffic in the system.

The method described above may be implemented on a per action basis or for the data processing system as a whole. An action may be an operation of a processing core, execution of an application, or execution of a process or thread of an application.

While the request servicing, monitoring and analysis processes are shown as parallel processes in FIG. 2, they may be performed in parallel, series or a combination thereof.

The method can be combined with an existing tiered memory organization scheme or used for selective caching in a system where the higher bandwidth memory is used as a cache.

Consistent with embodiments of the disclosure, memory accesses are used to update at least one action table that stores data related to the bandwidth utilization of different actions, where the actions correspond to core actions, processes, threads, applications or similar. In addition, memory accesses are used to update confidence counter tables that store confidence counters associated with a memory address or a program counter. When a confidence counters exceeds a threshold value, it provides an indication that a particular memory access is consistent and the associated data is a candidate for promotion to the higher bandwidth memory.

Figure 3:
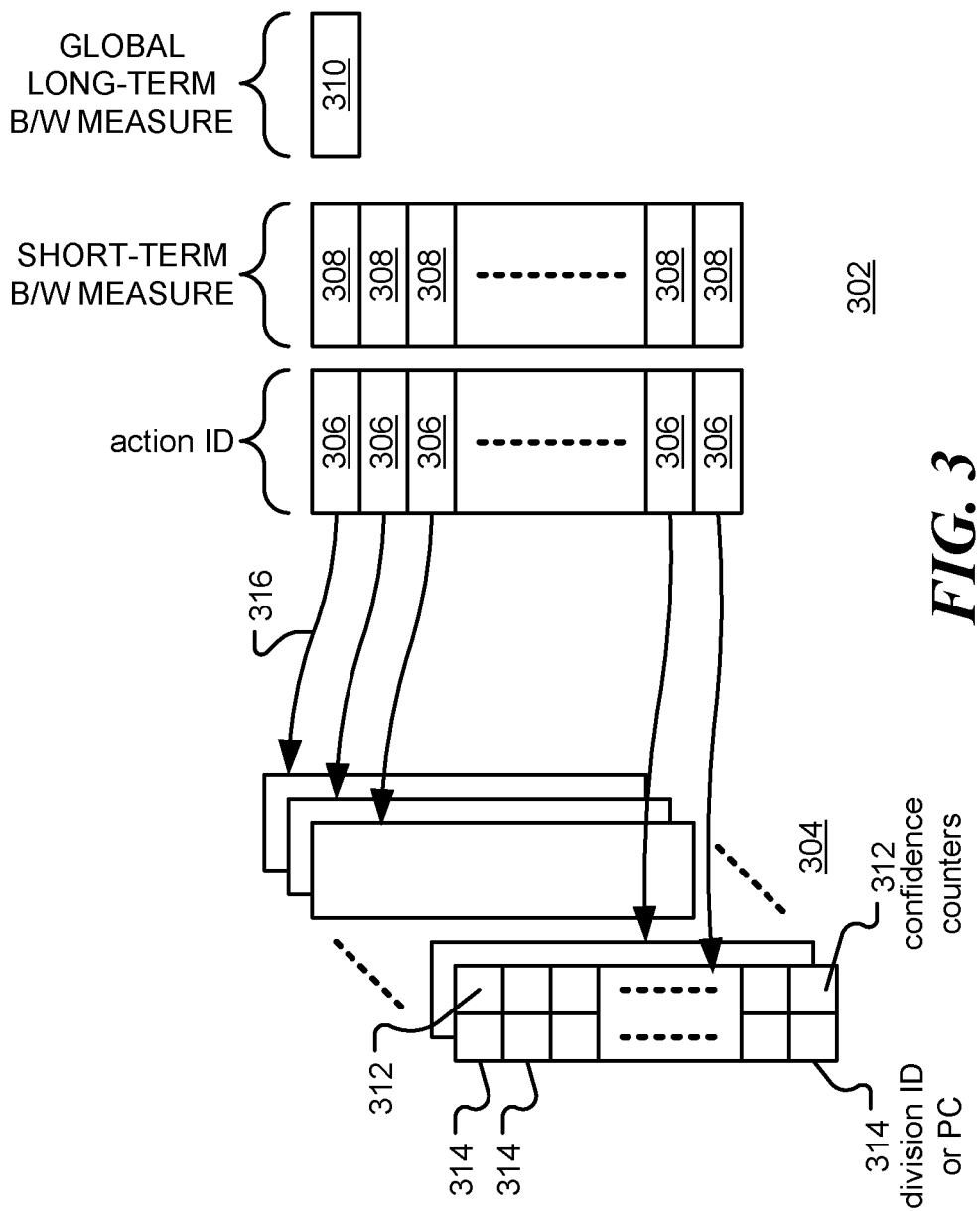
FIG. 3 is a diagram illustrating action and confidence counter tables, consistent with embodiments of the disclosure.

FIG. 3 is a diagrammatic representation of an action table 302 and a table of confidence counters 304, consistent with embodiments of the disclosure. Each line of action table 302 is associated with an action indicated by an action identifier (ID) in entry 306. For each identified action, the table stores one or more bandwidth utilization measures in entries 308. A global long term bandwidth utilization measure is stored in entry 310. The measures may be counters, for example, or values derived from counters, such as averages or maximum values, that relate to the number of memory access in different time periods. Although two measures for each action are shown in table 302, a single measure or more than two measures may be stored for each action. In one embodiment, an action ID corresponds to a configuration register for a counter.

The measures may be made over different time intervals. In one embodiment, short-term measure stored in entries 308 and the long-term measure stored in entry 310 are used. The durations may be selected as a number of instruction cycles, for example. In one embodiment, the shorter term measure may count the number of memory access in a moving time window for example. When the long term measure (in entry 310) moves above an upper threshold value, the system is determined to enter a high bandwidth phase. When the long term measure (in entry 310) falls below a lower threshold value, the system is determined to have exited the high bandwidth phase.

In order determine if, while an action is in a high bandwidth phase, accesses to the memory are consistent, i.e. to the same region of memory, additional measures, termed confidence counters, are used. The confidence counters are stored in entries 312 in confidence counter table 304. Entry 314 in table 304 contains an identifier of a division of memory or a particular instruction. The identifier may be a memory address or a program counter value, for example. In one embodiment, when the short term measure in entry 308 of table 302 exceeds a threshold value, the confidence counter associated with the instruction or memory address is incremented. When the short term measures are below the threshold value, the associated confidence counter is decremented. A confidence counter table 304 may be maintained for each action in action table 302, as indicated in FIG. 2 by arrows 316.

In order to determine when to promote data from a division of lower bandwidth memory to a division of higher bandwidth memory, three conditions must be satisfied. Firstly, the confidence counter associated with that region of memory must be above a threshold value. Secondly, the associated action must be in a high bandwidth phase. Thirdly, the bandwidth utilization of the higher bandwidth memory is below a threshold.

Figure 4:
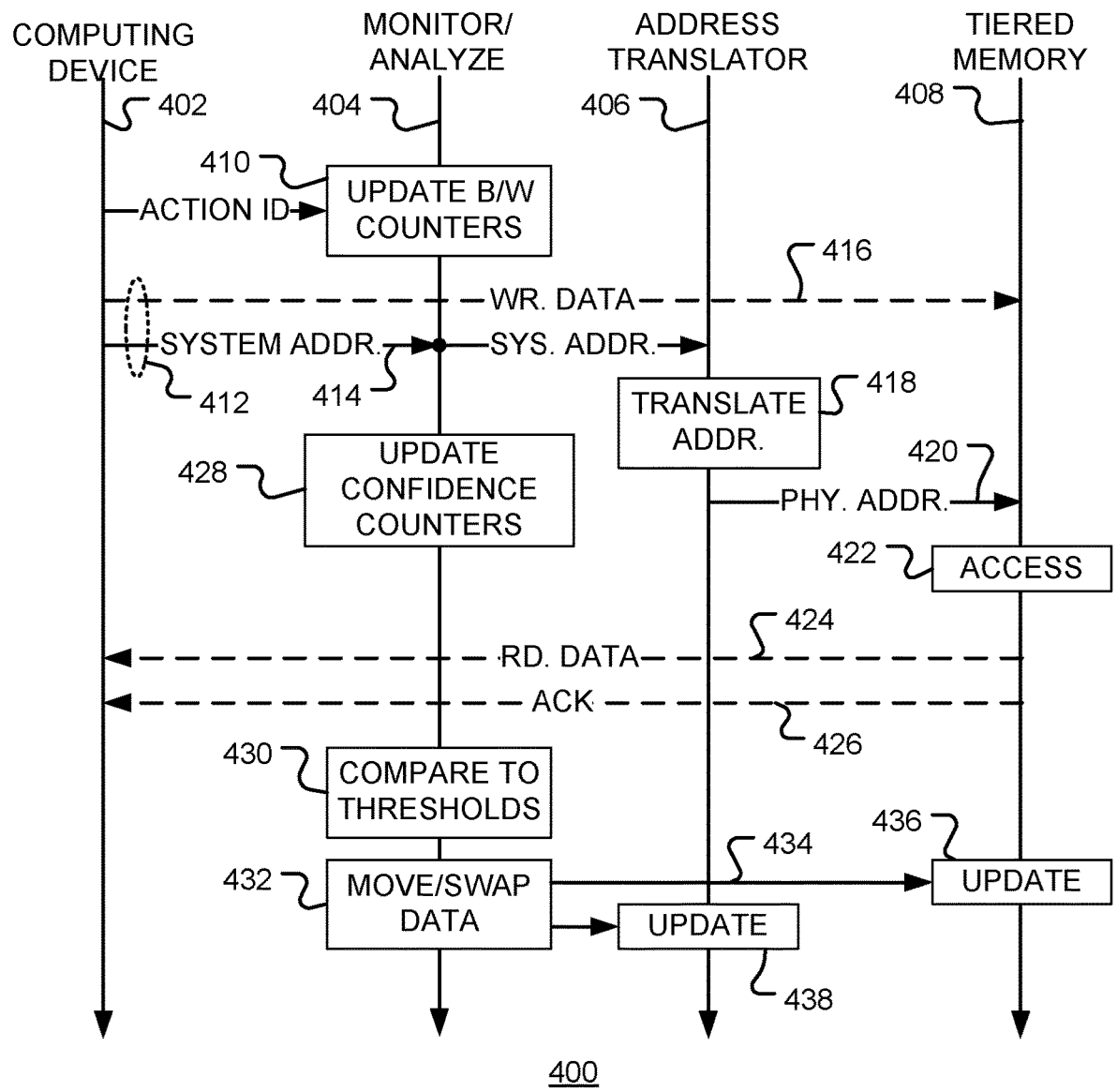
FIG. 4 is a signal flow chart of a method for controlling data organization in a tiered memory system, consistent with the disclosure.

FIG. 4 is a signal flow chart 400 in accordance with embodiments of the disclosure. Here, elements the data processing system are grouped as computing device 402, memory monitor/analyzer 404, address translator 406 and tiered memory system 408. However, the elements may be grouped in other ways. Memory monitor/analyzer 404 monitors accesses to the tiered memory 408. When computing device 402 performs an action that initiates an access to the tiered memory system 408, bandwidth utilization counters associated with action are updated at 410. The counters may be part of a performance monitoring unit of the computing device, for example. A memory access request 412 is then sent to the system. The request 412 includes a system address 414 that is signaled to the memory monitor/analyzer 404 and the address translator 406. Additionally, if the request is a write request, data 416 to be written to the memory associated with the system address is also passed to the tiered memory 408. The system address 414 is translated at 418 to provide a physical address 420 in the tiered memory. The requested physical location (in the first or second memory) is accessed at 422. If the request was a read request, the accessed data 424 is returned to the processor 402. Optionally, an acknowledgment 426 or other response is returned to processor 402.

In response to the access request 412, confidence counters are updated at 428. At 430, the bandwidth utilization counters and confidence counters (or values derived therefrom) are compared to threshold values to determine is associated data should be moved or copied from the first memory to the second memory (i.e. promoted). If needed, movement of the data is initiated at 432. Movement of the data requires interaction 434 with the tiered memory 408 that updates the data organization at 436. Data may be moved or copied in various sized chunks or divisions. For example, a memory division may be a line or a page. Other sized memory divisions may be used. As part of the process of data movement, the written data may replace previously stored data in the second memory. The previously stored data may be written back to the first memory (i.e. demoted) or simply overwritten. As a further part of the process of data movement, the system-physical address translator is updated at 438 to indicate to new physical location of the moved data in the tiered memory (and, optionally, the new physical location of data demoted from the second memory to the first memory).

Optionally, actions of the memory monitor/analyzer 404, address translator 406 and tiered memory system 408 may be performed in parallel.

The mechanisms, of which example embodiments have been described above, may be implemented in an integrated circuit. The circuit may be described by a set of instructions of a Hardware Description Language (HDL) instructions, which may be stored in a non-transient computer readable medium, for example. The instructions may be distributed via the computer readable medium or via other means such as a wired or wireless network. The instructions may be used to control manufacture, configuration or design of the circuit, and may be combined with other instructions. Alternatively, the circuit may be described by a netlist stored on a non-transitory computer-readable medium. The netlist may be used, for example, to control manufacture the circuit or the specify the circuit, and may be combined with other netlists.

Identification of candidates for demotion from higher bandwidth memory to a lower bandwidth (and possibly higher capacity) memory may be implemented in various ways and depends on the details of how the memories are organized. For example, the oldest data in the higher bandwidth memory may be demoted, or the lowest priority data in the higher bandwidth data may be demoted.

FIG. 5 shows a further embodiment of a data processing system 500 with a tiered memory system 502, consistent with the disclosure. In this embodiment, the tiered memory system, which includes first memory 504 and second memory 506, is located 'off-chip' (as indicated by broken line 110). As discussed above, first memory 504 may be, for example, a high-capacity/low-bandwidth memory. Second memory 506 may be a low-capacity/high-bandwidth memory, compared to the first memory.

FIG. 6 shows a still further embodiment of a data processing system 600 with a tiered memory system 104, consistent with the disclosure. In this embodiment, the tiered memory system, which includes first memory 106 and second memory 108, is located 'off-chip'. In addition, address translator 120, control unit 122, bandwidth counters 126 and confidence counters 130 are also located off-chip (as indicated by broken line 110).

Generally, the functional elements may be implemented on one or more chips.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A method for controlling data organization in a tiered memory system, the method comprising: monitoring accesses to the tiered memory system by an action of a computing device in a first time interval to provide a first measure of bandwidth utilization of a first memory of the tiered memory system, the action due to execution of first instructions by the computing device; determining when the action is in a high bandwidth phase for which a first measure of bandwidth utilization is greater than an upper value; determining when an access of the monitored accesses is consistent with respect to the first instructions or with respect to a memory address of the access; and writing data associated with the access of the first memory to a second memory of the tiered memory system when the action is in a high bandwidth phase and the access is consistent, where the second memory has a higher bandwidth than the first memory 2. The method of item 1, where determining if the access of the monitored accesses is consistent with respect to the first instructions or with respect to the memory address of the access comprises: monitoring accesses to the tiered memory system by the action of the computing device in a second time interval to provide a second measure of bandwidth utilization; storing an identifier of an instruction of the first instructions or the memory address of the access; storing a number of accesses associated with the stored identifier; responsive to an access associated with the stored identifier: incrementing the number of accesses associated with stored identifier of the instruction when the second measure of bandwidth utilization exceeds a first threshold value; and decrementing the number of accesses associated with stored identifier of the instruction when the second measure of bandwidth utilization is below the first threshold value; and comparing the number of accesses associated with stored identifier to a second threshold value.

3. The method of item 2, where the second time interval is shorter than the first time interval and comprises a moving window.

4. The method of item 2, where the identifier of the first instructions comprises a program counter value.

5. The method of item 1, wherein the first instructions are associated with a thread, a process, an application.

6. The method of item 1, where writing data associated with the access of the first memory to the second memory comprises: moving the data from a first address in the first memory to a second address in the second memory; moving data previously stored at the second address in the second memory to the first address in the first memory; and updating an address translator, where the address translator translates an address in the tiered memory to an address in the first memory or an address in the second memory.

7. The method of item 1, further comprising updating an address translator, where the address translator translates an address in the tiered memory to an address in the first memory or an address in the second memory.

8. The method of item 1, where monitoring accesses to the tiered memory system by an action of the computing device in the first time interval to determine the first measure of bandwidth utilization comprises: counting the number of accesses to the tiered memory system by the action of the computing device in the first time interval; and determined an average rate of accesses to the tiered memory system.

9. The method of item 1, first comprising: determining the action to have exited a high bandwidth phase when first measure of bandwidth utilization falls below a lower threshold value.

10. The method of item 1, where first measure of bandwidth utilization comprises a measure of bandwidth utilization of the first memory and where writing data associated with the access of the first memory to the second memory when the action is in the high bandwidth phase and the access is consistent is performed only when bandwidth utilization of the second memory is not greater than a selected threshold.

11. An apparatus for organizing data storage in a tiered memory system comprising first and second memories, where the second memory has a higher bandwidth than the first memory, and where the apparatus comprises: a one or more bandwidth utilization counters that update responsive to an access to the tiered memory system by a computing device, where the computing device executes a program of instructions in accordance with a program counter; control logic that determines, from the one or more bandwidth utilization counters, when the computing device is in a high bandwidth phase; and a table of confidence counters that updates responsive to the access to the tiered memory system, where the table of confidence counters is indexed by a function of addresses accessed in the tiered memory or by a function of values of the program counter of the computing device, or by a function of the accessed address and the values of the program counters, where the control logic identifies, from the table of confidence counters, when data stored at a first address in the first memory is repeatedly accessed while the computing device is in a high bandwidth phase, and where the control logic causes the identified data at the first address in the first memory to be written to a second address in the second memory.

12. The apparatus of item 11, where the control logic causes data previously stored at the second address in the second memory to be written to the first address in the first memory.

13. The apparatus of item 11, where the first address comprises a physical address, the memory control system further comprising: an address translator that translates the first address to a physical address in the second memory when identified data at the first address in the first memory has been moved to the second address in the second memory, where the address translator is updated when the control logic causes the identified data at the first address in the first memory to be written to the second address in the second memory.

14. The apparatus of item 11, where the tiered memory system is addressed by a first address space, the apparatus further comprising: an address translator that translates an address in the first address space to a physical address in either the first memory or the second memory, where the address translator is updated when the control logic causes the identified data at the first address in the first memory to be written to the second address in the second memory.

15. The apparatus of item 11, where the at least one bandwidth counter comprises: a first bandwidth counter that counts a first number of accesses to the tiered memory by the computing device during a first time interval; and a second bandwidth counter that counts a second number of accesses to the tiered memory by the computing device during a second time interval, where the second time interval is longer than the first time interval, where a confidence counter in the table of confidence counters is incremented when the first bandwidth counter exceeds a first threshold value and is decremented when the first bandwidth counter is below the first threshold value; and where the control logic determines the computing device to be in a high bandwidth phase when the second number of accesses exceeds an upper threshold value.

16. The apparatus of item 11, where the first time interval comprises moving time window.

17. The apparatus of item 11, where data stored at a first address in the first memory is determined to be repeatedly accessed when an associated confidence counter exceeds a second threshold value.

18. The apparatus of item 11, where: the one or more bandwidth utilization counters comprise a high bandwidth utilization counter that updates responsive to an access to the second memory of the tiered memory system; the control logic is configured to determine, from the high bandwidth utilization counter, when bandwidth utilization of the second memory is above a threshold; and where the control logic causes the identified data at the first address in the first memory to be written to the second address in the second memory only when bandwidth utilization of the second memory is not above the selected threshold.

19. The apparatus of item 11, where second memory comprises a cache and where the control logic causes the identified data at the first address in the first memory to be copied to the second address in the second memory.

20. The apparatus of item 11, where second memory comprises system memory and where the control logic causes the identified data at the first address in the first memory to be moved to the second address in the second memory.

21. An integrated circuit comprising the apparatus of item 11 and further comprising: the computing device; the second memory; the address translator; and an interface to the first memory.

22. The integrated circuit of item 21, where the second memory comprises a high-bandwidth, stacked-die memory.

23. A non-transient computer readable medium containing instructions of a hardware description language descriptive of the apparatus of item 11.

24. A non-transient computer readable medium containing a netlist description of the apparatus of item 11.

What is claimed is:
1. A method for controlling data organization in a tiered memory system, the method comprising:
monitoring accesses to the tiered memory system by an action of a computing device in a first time interval to provide a first measure of bandwidth utilization of a first memory of the tiered memory system, the action due to execution of first instructions by the computing device in accordance with a program counter;

determining when the action is in a high bandwidth phase for which a first measure of bandwidth utilization is greater than an upper value;

updating a table of confidence counters, responsive to the accesses to the tiered memory system, the table of confidence counters indexed by identifiers of instructions that are a function of values of the program counter or a function of addresses accessed in the tiered memory and values of the program counter;

determining when an access of the monitored accesses is consistent with respect to the first instructions and with respect to a memory address of the access; and writing data associated with the access of the first memory to a second memory of the tiered memory system when the action is in a high bandwidth phase and the access is consistent, where the second memory has a higher bandwidth than the first memory, and where said determining when the access of the monitored accesses is consistent with respect to the first instructions includes identifying, from the table of confidence counters, when data stored at a first address in the first memory is repeatedly accessed by the first instructions while the computing device is in a high bandwidth phase.

2. The method of claim 1, where said updating the table of confidence counters responsive to the accesses to the tiered memory system includes:

monitoring accesses to the tiered memory system by the action of the computing device in a second time interval to provide a second measure of bandwidth utilization;

responsive to an access associated with an identifier of an instruction:
incrementing a confidence counter, in the table of confidence counters, indicative of the number of accesses associated with the identifier of the instruction when the second measure of bandwidth utilization exceeds a first threshold value; and
decrementing the confidence counter indicative of the number of accesses associated with the identifier of the instruction when the second measure of bandwidth utilization is below the first threshold value; and where said determining when the access of the monitored accesses is consistent with respect to the first instructions includes:
comparing the confidence counter indicative of the number of accesses associated with identifier to a second threshold value.

3. The method of claim 2, where the second time interval is shorter than the first time interval and includes a moving window.

4. The method of claim 2, where the identifier of the first instructions includes a program counter value.

5. The method of claim 1, wherein the first instructions are associated with a thread, a process, or an application.

6. The method of claim 1, where writing data associated with the access of the first memory to the second memory comprises:
moving the data from a first address in the first memory to a second address in the second memory;
moving data previously stored at the second address in the second memory to the first address in the first memory; and
updating an address translator, where the address translator translates an address in the tiered memory to an address in the first memory or an address in the second memory.

7. The method of claim 1, further comprising updating an address translator, where the address translator translates an address in the tiered memory to an address in the first memory or an address in the second memory.

8. The method of claim 1, where monitoring accesses to the tiered memory system by an action of the computing device in the first time interval to determine the first measure of bandwidth utilization includes:
counting the number of accesses to the tiered memory system by the action of the computing device in the first time interval; and
determining an average rate of accesses to the tiered memory system.

9. The method of claim 1, further comprising:
determining the action to have exited a high bandwidth phase when first measure of bandwidth utilization falls below a lower threshold value.

10. The method of claim 1, where the first measure of bandwidth utilization includes a measure of bandwidth utilization of the first memory and where writing data associated with the access of the first memory to the second memory when the action is in the high bandwidth phase and the access is consistent is performed only when bandwidth utilization of the second memory is not greater than a selected threshold.

11. An apparatus for organizing data storage in a tiered memory system comprising first and second memories, where the second memory has a higher bandwidth than the first memory, and where the apparatus includes:
one or more bandwidth utilization counters that update responsive to an access to the tiered memory system by a computing device, where the computing device executes a program of instructions in accordance with a program counter;
control logic that determines, from the one or more bandwidth utilization counters, when the computing device is in a high bandwidth phase; and
a table of confidence counters that updates responsive to the access to the tiered memory system, where the table of confidence counters is indexed by instruction identifiers that are a function of values of the program counter of the computing device, or a function of addresses accessed in the tiered memory and the values of the program counter,
where the control logic identifies, from the table of confidence counters, when data stored at a first address in the first memory and associated with an instruction identifier is repeatedly accessed while the computing device is in a high bandwidth phase, and
where the control logic causes the identified data at the first address in the first memory to be written to a second address in the second memory.

12. The apparatus of claim 11, where the control logic causes data previously stored at the second address in the second memory to be written to the first address in the first memory.

13. The apparatus of claim 11, where the first address includes a physical address, the memory control system further comprising:
an address translator that translates the first address to a physical address in the second memory when identified data at the first address in the first memory has been moved to the second address in the second memory, where the address translator is updated when the control logic causes the identified data at the first address in the first memory to be written to the second address in the second memory.

14. The apparatus of claim 11, where the tiered memory system is addressed by a first address space, the apparatus further comprising:
an address translator that translates an address in the first address space to a physical address in either the first memory or the second memory,
where the address translator is updated when the control logic causes the identified data at the first address in the first memory to be written to the second address in the second memory.

15. The apparatus of claim 11, where the one or more bandwidth utilization counters include:
a first bandwidth counter, associated with a first program counter, that counts a first number of accesses to the tiered memory by the computing device during a first time interval; and
a second bandwidth counter, also associated with the first program counter, that counts a second number of accesses to the tiered memory by the computing device during a second time interval, where the second time interval is longer than the first time interval,
where a confidence counter in the table of confidence counters is incremented when the first bandwidth counter exceeds a first threshold value and is decremented when the first bandwidth counter is below the first threshold value; and
where the control logic determines the computing device to be in a high bandwidth phase when the second number of accesses exceeds an upper threshold value.

16. The apparatus of claim 15, where the first time interval includes a moving time window.

17. The apparatus of claim 11, where data stored at a first address in the first memory is determined to be repeatedly accessed when an associated confidence counter exceeds a second threshold value.

18. The apparatus of claim 11, where:
the one or more bandwidth utilization counters include a high bandwidth utilization counter that updates responsive to an access to the second memory of the tiered memory system;
the control logic is configured to determine, from the high bandwidth utilization counter, when bandwidth utilization of the second memory is above a threshold; and
where the control logic causes the identified data at the first address in the first memory to be written to the second address in the second memory only when bandwidth utilization of the second memory is not above the selected threshold.

19. The apparatus of claim 11, where the second memory includes a cache and where the control logic causes the identified data at the first address in the first memory to be copied to the second address in the second memory.

20. The apparatus of claim 11, where the second memory includes system memory and where the control logic causes the identified data at the first address in the first memory to be moved to the second address in the second memory.

21. An integrated circuit comprising the apparatus of claim 11 and further comprising:
the computing device;
the second memory;
the address translator; and
an interface to the first memory.

22. The integrated circuit of claim 21, where the second memory includes a high-bandwidth, stacked-die memory.

23. A non-transitory computer readable medium containing instructions of a hardware description language descriptive of the apparatus of claim 11.

24. A non-transitory computer readable medium containing a netlist description of the apparatus of claim 11.

* * * * *